Nov. 2, 1965 M. CORRADETTI 3,215,853

CIRCUIT INCLUDING TRANSISTOR HAVING LOW BACK VOLTAGE CHARACTERISTIC FOR SWITCHING A HIGH VOLTAGE, NEGATIVE-IMPEDANCE DEVICE

Filed Oct. 11, 1961

INVENTOR
MARCELLO CORRADETTI
BY Curtis Ailes Jr.
ATTORNEY

United States Patent Office 3,215,853

Patented Nov. 2, 1965

3,215,853

CIRCUIT INCLUDING TRANSISTOR HAVING LOW BACK VOLTAGE CHARACTERISTIC FOR SWITCHING A HIGH VOLTAGE, NEGATIVE-IMPEDANCE DEVICE

Marcello Corradetti, Boeblingen, Germany, assignor to International Business Machines Corporation, New York, N.Y., a corporation of New York Filed Oct. 11, 1961, Ser. No. 144,506

2 Claims. (Cl. 307—88.5)

Figure 1:
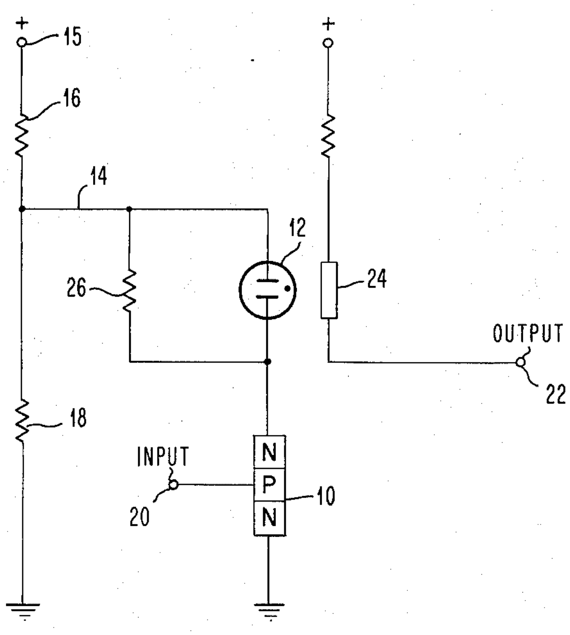

This invention relates to transistor switching circuits which are particularly adapted for the employment of low-voltage transistors for switching high-voltage negative impedance devices.

Various attempts have been made to design circuits for the purpose of switching high-voltage negative impedance devices, such as neon glow lamps, by means of transistors. Such prior switching circuits usually employ transistors particularly chosen for their high back voltage characteristics and the transistor is generally protected against excessive back voltage by an intermediate clamping voltage. Selection of the high-voltage transistor is based on the assumption that the transistor must withstand a voltage equal to at least the difference between the firing (or current initiating) voltage and the current maintaining voltage of the negative impedance device. The necessity for selecting a transistor having a high back voltage characteristic results in a substantial increase in cost of the transistor. And the provision of an auxiliary clamping voltage represents an undesirable complication and increase in circuit cost.

Accordingly, it is an object of the present invention to provide a simple and inexpensive transistor switching circuit for a high-voltage negative impedance device which may utilize a transistor having a low back voltage characteristic.

Another object of the invention is to provide a transistor switching circuit for a high-voltage device in which no intermediate clamping voltage source is required.

Another object of the invention is to provide a workable simple series-connected switching arrangement for a low-voltage transistor and a high-voltage negative impedance device controlled by the transistor.

Another object of the invention is to provide an economical circuit for converting low-voltage electrical transistor signals to optical output signals.

Another object of the invention is to provide an economical circuit for converting low-voltage electrical transistor signals to photoconductor controlled output signals.

In carrying out the objects of the invention in one preferred embodiment thereof a high-voltage negative impedance device in the form of a neon glow lamp is connected in series with the collector-emitter circuit of a low-voltage transistor. This series combination is connected to be supplied with an operating voltage from a regulated supply circuit which is designed to provide an open circuit voltage to the series combination which is above the firing voltage of the neon but which is below the firing voltage of the neon plus the rated back voltage of the transistor. The inherent capacitance of the transistor is at least twice the inherent capacitance of the neon. The back voltage rating of the transistor may be less than the difference between the firing and maintaining voltages of the neon.

For a more complete understanding of the invention reference should be made to the following specification and the accompanying drawings, as follows:

FIG. 1 is a schematic circuit diagram illustrating a preferred embodiment of the invention.

Figure 2:
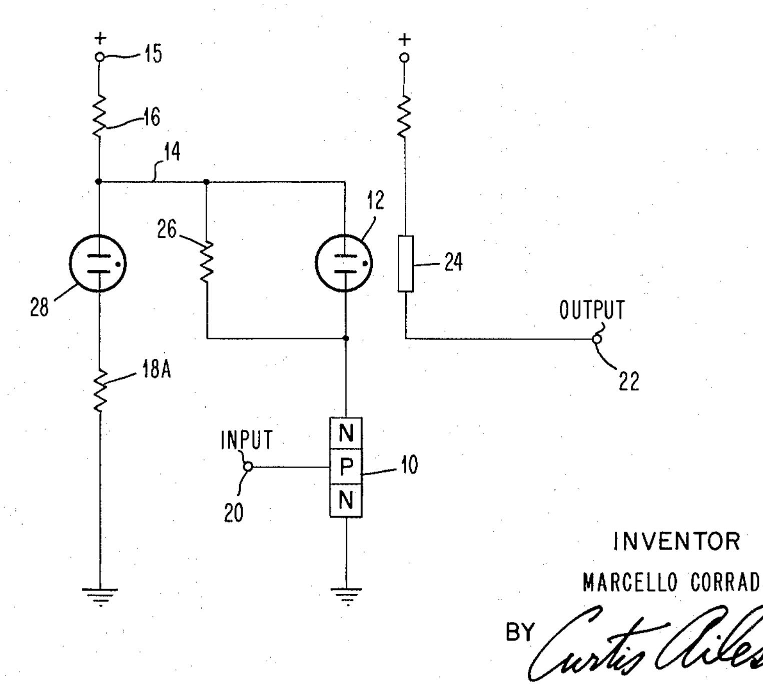

And FIG. 2 is a schematic circuit diagram illustrating a modification of the embodiment of FIG. 1.

Referring more particularly to FIG. 1 there is shown a transistor 10 connected in series circuit relationship with a neon glow lamp 12, and the series combination of 10 and 12 is connected at 14 to receive an operating voltage from a source connected at the power terminal indicated at 15 through a voltage divider formed by resistances 16 and 18. The voltage supply at terminal 15 may be a direct current voltage from a conventional voltage source (not shown).

An input signal may be applied to the base of the transistor at an input terminal 20, and an electrical output may be provided at output terminal 22 through illumination of a photoconductor 24 by the lamp 12. If only a visual or optical light output is desired, the photoconductor 24 and output terminal 22 may be omitted.

An auxiliary resistor 26 may be provided in parallel with lamp 12. Resistor 26 has a high resistance value but it has sufficient conductivity to permit passage of the transistor $I_{co}$ current when neon lamp 12 is off. Thus, there need not be any persistence of glow discharge in lamp 12 when the main circuit current is switched off. The presence of resistor 26 and the associated $I_{co}$ current there-through also provides a self-biasing affect for the transistor 10. Thus, where otherwise a separate bias voltage circuit for the bias of the transistor would be required, this is avoided by the presence of resistor 26.

FIG. 2 is substantially identical to FIG. 1 except that an additional neon glow lamp 28 is added in the resistor 18 branch of the voltage divider circuit. Since resistor 18 is then reduced in resistance value, the modified resistor 18 is indicated as 18A in FIG. 2. The other components are all identical to those of FIG. 1 and they are similarly numbered.

Referring again to FIG. 1, it is the function of the transistor 10 to switch its emitter collector circuit on and off to control the current conduction through the associated neon glow lamp 12. A neon glow lamp of the type presently under consideration for lamp 12 may normally have a starting or firing voltage in the order of 130 volts and a conduction maintaining voltage in the order of 60 volts. Previous design attempts at transistor circuits for switching neon glow lamps have generally been based upon the premise that the transistor must be capable of handling at least the difference between the 130 volt neon firing voltage and the 60 volt neon maintaining voltage in order to successfully operate the circuit. This problem is further accentuated by the fact that a current limiting impedance generally must be employed with such non-linear devices and a correspondingly high supply voltage must be used to not only supply the voltage drop across the device, but also the drop across the impedance. Since many transistors, including those which are least expensive, are capable of handling a reverse or back voltage in the collector-emitter circuit of no more than in the order of 20 volts, this requirement has necessitated that the transistors be especially selected for a high back voltage characteristic at a large increase in cost. However, I have discovered that if certain circuit parameters are employed, the transistor need not be capable of withstanding an abnormally high back voltage and consequently transistors having ordinary back voltage capabilities may be employed for switching high-voltage negative impedance devices such as neon glow lamps.

Briefly stated, I have discovered that if the circuit parameters are properly chosen, the neon lamp itself may be caused to withstand a major portion of both the transient and the steady state open circuit voltage across the series combination of the neon lamp and the transistor. Thus, the transistor need handle only a small fraction of the total voltage across the series combination at any time.

I have discovered that the necessary circuit parameter requirements are that the inherent collector emitter circuit capacitance of the transistor must be at least twice as great as as the inherent interelectrode capacitance of the neon lamp and the open circuit voltage across the transistor and the neon lamp must not exceed the sum of the neon firing voltage plus the rated transistor back voltage. The difference between the neon firing and maintaining voltages may then exceed the rated transistor back voltage.

The resistor 16 not only forms a part of the voltage divider but it also serves as a current limiting resistor for the neon glow lamp 12 when the lamp is in the conductive state. This is necessary because of the negative impedance characteristic of the neon. The resistance value of the current limiting resistor 16 therefore must be chosen to provide a desired current level in the neon glow lamp 12 to obtain the desired illumination from that lamp. In practical circuits a suitable value of this current is in the order of one milliampere.

The most critical part of the operation of a circuit in which a transistor controls the current through a negative impedance device such as a neon lamp is in turning off the lamp under the control of the transistor. I have discovered that if the circuit parameters specified in this invention are not observed, the transistor is subjected to very high back voltages with the result that the transistor breaks down as it attempts interruption of the circuit, and the series combination of the neon and transistor remain conductive. However, when the circuit of this invention is employed, as the transistor shuts off and begins to assume a portion of the open circuit voltage, its inherent capacitance commences to charge. As soon as the transistor assumes a voltage sufficient to reduce the voltage across the neon below the conduction maintaining value, the neon also begins to assume a fraction of the open circuit voltage through the charging of its inherent capacitance. Since the inherent capacitance of the transistor is at least twice as great as the inherent capacitance of the neon, the neon assumes an open circuit charge voltage more rapidly than the transistor, and in this manner the neon assumes the major fraction of the open circuit voltage and the transistor need assume only a minor fraction thereof. Once the current through the neon is interrupted, as long as the voltage across the transistor is sufficient to prevent the neon voltage from exceeding the neon firing voltage, the circuit remains off. Thus, in the presence of the voltage regulation provided by the voltage divider formed by resistors 16 and 18, it does not matter if the voltage appearing across the transistor actually exceeds its rated back voltage, provided interruption of the neon already has occurred, for with the neon in the non-conductive state, a breakdown current in the transistor will not be of destructive magnitude. It is actually a normal mode of open circuit operation of the invention for the transistor to be, and remain in, this very low current, non-destructive, "break-down" state. When in this state it assumes its full share of the open circuit voltage corresponding to its entire rated back voltage. This is sufficient to maintain the neon in its non-conductive state.

As shown in FIG. 2, part of the function of resistor 18 may be taken by an additional neon glow lamp 28. Lamp 28 and the circuit constants must be so chosen that lamp 28 is conductive when lamp 12 is shut off. In this way, the maintaining voltage across lamp 28, which is relatively constant, becomes part of the regulated open circuit voltage across the series combination of transistor 10 and lamp 12. The modification of FIG. 2 is believed to have some advantages over the embodiment of FIG. 1 because the auxiliary voltage regulator lamp 28 is a more precise voltage regulating element than is the resistor 18, and it will not dissipate quite as much power in relation to its voltage drop. A further advantage of the modification of FIG. 2 relates to the fact that if the lamp 12 is maintained in operation for an extended period of time its firing voltage may decrease with age. The maintaining voltage of lamp 28 may be relied upon to likewise decrease somewhat with age so that this circuit will compensate at least in part for the change in the firing voltage characteristic of lamp 12.

A further advantage relates to the observation that a neon lamp is more consistent in its operation and will fire more easily if it has been exposed to a certain amount of ambient illumination from another source. Accordingly, the system of FIG. 2 may be arranged so that a small amount of light from regulator lamp 28 falls upon neon 12 when neon 12 is off. In this way, neon 12 is maintained in the state in which it is easily fired. This is a further advantage of the embodiment of FIG. 2.

It will be understood that in either of the embodiments of FIG. 1 or 2 a large number of series combinations corresponding to transistor 10 and lamp 12 may be supplied from point 14 of the regulated voltage divider supply circuit including resistors 16 and 18 (or resistors 16, 18A and lamp 28). But this is true only when the various transistor lamp circuits are to be conductive one at a time.

Since resistor 16 is basically a current control resistor and since the voltage across resistor 18, between connection 14 and ground, is the voltage which must be precisely regulated, the resistor 18 or the combination of 18A and auxiliary lamp 28, or equivalents thereof, may be referred to hereinafter as voltage regulating apparatus. It will be appreciated that voltage regulating apparatus other than the simple circuit elements shown may be employed in various embodiments of the present invention. With more elaborate voltage regulating apparatus which is less dependent upon current flow therethrough, it is possible to use a single voltage regulator for a number of transistor and controlled lamp combinations.

For the purpose of making this disclosure as complete as possible, typical successful circuit constants are given below but I do not intend to indicate that the scope of the invention is necessarily limited to such circuit constants.

Typical circuit constants for the embodiment of FIG. 1 are as follows:

| | |
|---|---|
| Supply voltage at **15** | 300 volts D.C. |
| Resistor **16** | 220,000 ohms. |
| Resistor **18** | 200,000 ohms. |
| Resistor **26** | 1.2 megohms. |
| Neon lamp **12** | GE type NE–2H: Firing voltage about 135; maintaining voltage about 70. |
| Transistor **10** | Texas Instruments type 2N1302: Collector-emitter back voltage 25. |

The inherent capacity of the neon is in the order of one-half micromicrofarad and the inherent capacity of the transistor is in the order of 10 micromicrofarads and above. As previously stated, the inherent capacitance of the transistor should be at least twice the inherent capacitance of the neon. This is not a difficult requirement to fulfill with inexpensive commercially available components. Within the above limitations, many commercially available transistors may be employed in the present invention. While the circuits as shown are applicable to NPN type transistors, the same circuits may be employed with PNP transistors by simply reversing the polarity of the supply voltage.

Typical circuit constants for the embodiment of FIG. 2 are the same as for FIG. 1 except that resistor 18A may have a value of 100,000 ohms and the auxiliary neon lamp 28 may be a GE type NE–68 having a rated firing voltage of 60 to 90 and a rated maintaining voltage of 52 to 65.

While the invention has been particularly shown and described with reference to preferred embodiments thereof, it will be understood by those skilled in the art that various changes in form and details may be made therein without departing from the spirit and scope of the invention.

What is claimed is:

1. A direct current switching circuit comprising a neon glow lamp and a transistor connected in series therewith, said lamp having a conduction initiation voltage which is substantially higher than its conduction maintenance voltage, a current limiting resistor connected in series with said lamp and said transistor, a maximum voltage regulation device connected in shunt with the series combination of said lamp and said transistor, said voltage regulation device being operable under non-conductive conditions of said lamp and transistor to maintain the voltage thereacross at a value less than the sum of the rated transistor back voltage plus the conduction initiation voltage of said lamp but greater than said conduction initiation voltage, the inherent capacitance of said transistor being at least twice as great as the inherent capacitance of said lamp, the transistor back voltage being less than the difference between the conduction initiation voltage and the conduction maintenance voltage of said lamp, and a self-biasing resistor having a high resistance value connected in series with said transistor and in shunt with said lamp.

2. A direct current switching circuit comprising a first neon glow lamp and a transistor connected in series therewith, said first lamp having a conduction initiation voltage which is substantially higher than its conduction maintenance voltage, a current limiting resistor connected in series with said first lamp and said transistor, a shunt impedance circuit comprising a resistor and an auxiliary neon glow lamp conected in shunt with the series combination of said first lamp and said transistor, said shunt impedance circuit forming a voltage divider with said current limiting resistor which is operable under non-conductive conditions of said first lamp and said transistor to maintain the voltage thereacross at a value less than the sum of the rated transistor back voltage plus the conduction initiation voltage of said first lamp but greater than said conduction initiation voltage alone, said auxiliary lamp being conductive when said first lamp is non-conductive, the inherent capacitance of said transistor being at least twice as great as the inherent capacitance of said lamp, the transistor back voltage being less than the difference between the conduction initiation voltage and the conduction maintenance voltage of said lamp, and a self-biasing resistor in parallel with said first lamp and in series with said transistor.

References Cited by the Examiner

UNITED STATES PATENTS

| | | | |
|---|---|---|---|
| 2,772,410 | 11/56 | Logue et al. | |
| 2,876,387 | 3/59 | Doeleman. | |
| 2,899,606 | 8/59 | Hicks | 315—200.1 X |
| 2,927,247 | 3/60 | Hennis. | |
| 3,034,112 | 5/62 | Fitch | 315—135 X |

ARTHUR GAUSS, *Primary Examiner.*

JOHN W. HUCKERT, *Examiner.*